(12) United States Patent
Ocalan et al.

(10) Patent No.: US 7,950,590 B2
(45) Date of Patent: May 31, 2011

(54) TEMPERATURE TRIGGERED ACTUATOR

(75) Inventors: Murat Ocalan, Boston, MA (US); Kuo Chiang Chen, Lexington, MA (US)

(73) Assignee: Schlumberger Technology Corporation, Cambridge, MA (US)

( * ) Notice: Subject to any disclaimer, the term of this patent is extended or adjusted under 35 U.S.C. 154(b) by 504 days.

(21) Appl. No.: 12/048,305

(22) Filed: Mar. 14, 2008

(65) Prior Publication Data
US 2009/0230335 A1 Sep. 17, 2009

(51) Int. Cl.
*G05D 23/00* (2006.01)
*F16K 31/08* (2006.01)
(52) U.S. Cl. ............. 236/88; 236/89; 236/93 R; 251/65
(58) Field of Classification Search .................... 236/88, 236/89, 93 R; 251/65
See application file for complete search history.

(56) References Cited

U.S. PATENT DOCUMENTS

| | | | | |
|---|---|---|---|---|
| 3,534,306 A | * | 10/1970 | Harnden, Jr. et al. | 335/146 |
| 3,895,328 A | * | 7/1975 | Kato et al. | 335/208 |
| 4,125,221 A | * | 11/1978 | Carlson | 236/93 R |
| 4,590,999 A | * | 5/1986 | Snaper | 169/37 |
| 5,535,828 A | | 7/1996 | der Kinderen et al. | |
| 7,311,152 B2 | | 12/2007 | Howard et al. | |
| 2005/0072578 A1 | | 4/2005 | Steele et al. | |
| 2007/0289734 A1 | | 12/2007 | McDonald et al. | |

FOREIGN PATENT DOCUMENTS
CN 2103634 U 5/1992

OTHER PUBLICATIONS

C.V. Deutsch et al, "Guide to SAGD (Steam Assisted Gravity Drainage) Reservoir Characterization Using Geostatistics", Center for Computational Geostatistics (CCG), Guidebook Series vol. 3, 2005, version 1, 15 pages.
S. Shitmizu et al, "Development of a Fail-safe Safety Valve and Safety Control System for Boilers", Specific Research Reports of the National Institute of Industrial Safety, NIIS-RR-2002 (2003), UDC 621.183.3:621.318.2:621.182.2, abstract only.

* cited by examiner

*Primary Examiner* — Marc E Norman
(74) *Attorney, Agent, or Firm* — Brigid Laffey; James McAleenan; Helene Raybaud

(57) ABSTRACT

An actuator is disclosed which operates on the principle of the variable magnetic properties of materials with respect to temperature. As temperature is raised past Curie temperature, magnetic permeability of certain materials drops significantly to a value close to free space permeability. However, depending on the material selection, magnetic permeability may be significantly higher below Curie temperature. This principle is used to cause magnetic attractive force to move an actuator at one temperature, while permitting a return spring force to move the actuator at another temperature by changing the pathway traversed by most magnetic lines of flux from a magnetic source. The actuator may be employed to provide a temperature activated electrical switch or fluid valve. The temperature activated valves are suited to use in high temperature environments, such as SAGD wells.

22 Claims, 16 Drawing Sheets

T<T_curie

T>T_curie

T<Tcurie

T>Tcurie

T<T_curie

T>T_curie

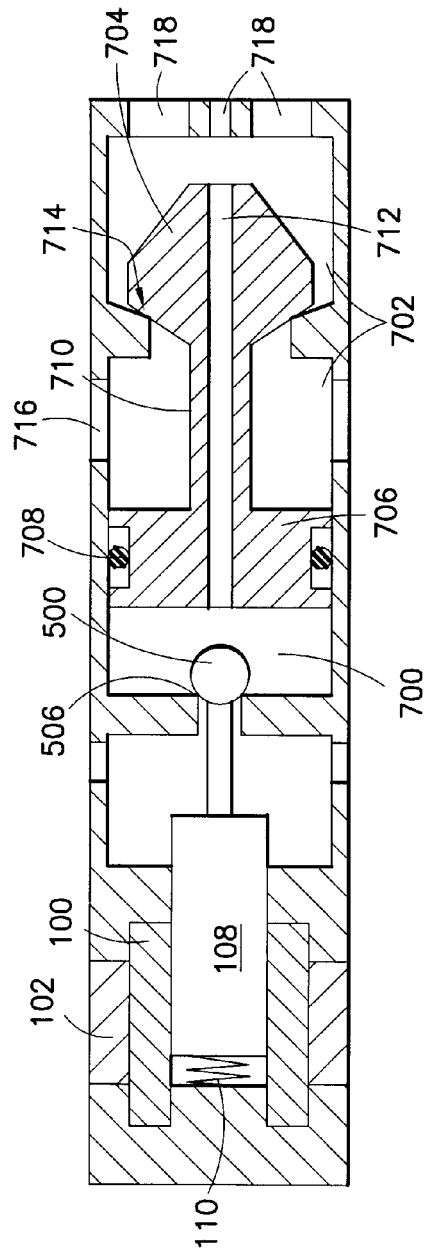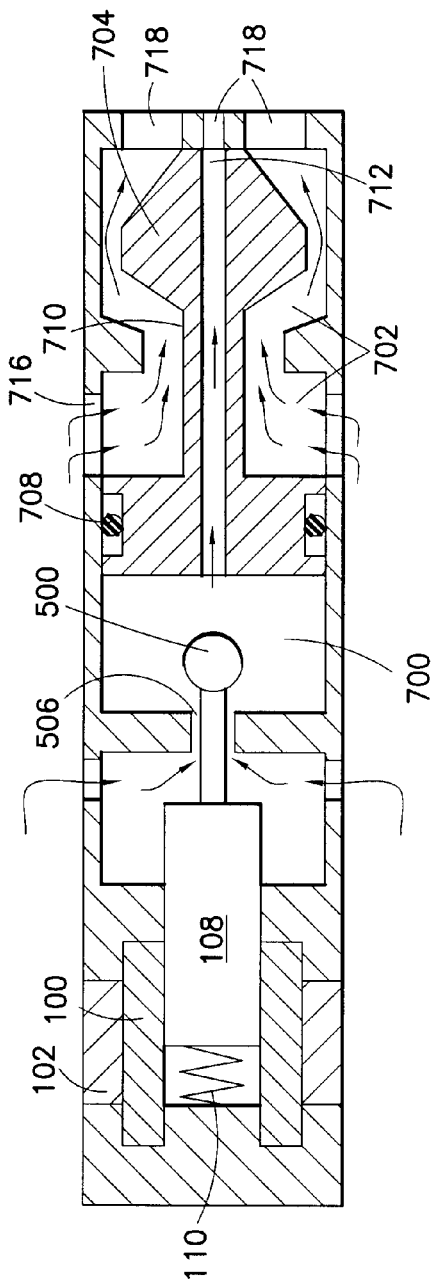
FIG.14A
FIG.14B

TEMPERATURE TRIGGERED ACTUATOR

FIELD OF THE INVENTION

This invention is generally related to temperature triggered actuators, and more particularly to a temperature triggered actuator capable of operating in conditions such as those found in steam assisted gravity drain bitumen recovery operations.

BACKGROUND OF THE INVENTION

Crude oil derived from bitumen associated with "oil sands" now accounts for a significant portion of the world's energy. Where deposits are located at or near the surface it is possible to employ mining techniques to move oil sands to a processor where the bitumen is separated from the sand. In situ production methods are used when deposits are buried too deep to be mined economically. Several techniques are known for decreasing the viscosity of the bitumen to facilitate in situ production, including steam injection, solvent injection and firefloods. Steam injection techniques include steam assisted gravity drain (SAGD), mixed well SAGD (Row of vertical wells used as steam injectors instead of horizontal steam injectors, FIG. 1), steam flooding (FIG. 2), cyclic steam simulation (FIG. 3).

The basic principles of in situ production by separating bitumen from sands with heat can be illustrated by SAGD. Steam is introduced to the deposit via one or more steam injection wells. The injected steam increases the temperature of the deposits surrounding the well, thereby decreasing the viscosity of the bitumen. In other words, heating melts the semi-solid bitumen, which allows it to separate from the sand. The separated bitumen flows downward in the reservoir due to the force of gravity and is captured by a production well. The captured bitumen is then pumped to the surface and mixed with liquids obtained from natural gas production (condensate) in preparation for transport and processing.

One problem associated with each of the techniques is direct production of an introduced element, e.g., steam. Even in a relatively homogenous deposit, pathways of lower hydraulic resistance may form, resulting in non-uniform steam penetration. If a pathway reaches the production tubing then steam may enter the production well. This is undesirable because it tends to decrease efficiency, damage equipment and contaminate the product.

It is known to throttle production wells in order to maintain production temperature below injected steam temperature, and thereby prevent direct production of steam. For example, it is known to maintain a temperature balance in SAGD applications with sensors and chokes. However, the relatively high reservoir temperatures associated with steam injection, e.g., 650° F., are too great for many control system components. Consequently, components are typically positioned well away from the wells. This is problematic, but is tends to compromise the accuracy and reliability of control. The situation is exacerbated by extended horizontal sections over which significant temperature variation may be present.

SUMMARY OF THE INVENTION

In accordance with an embodiment of the invention, apparatus actuated in response to temperature comprises: a power source operative to provide magnetic lines of flux; an actuator member; and an intermediate member; wherein, a first potential pathway for the magnetic lines of flux traverses the actuator member and a second potential pathway for the magnetic lines of flux traverses the intermediate member, and wherein magnetic permeability of the intermediate member at a first temperature is less than at a second temperature, the intermediate member positioned relative to the actuator member such that total magnetic flux directed to the actuator member is dependent upon magnetic permeability of the intermediate member, and thus magnetic attractive force which causes the actuator member to move in a first direction is a function of temperature.

In accordance with another embodiment of the invention, a method of triggering actuation of an actuator member in response to temperature comprises: with magnetic attractive force, causing an actuator member to move in a first direction, the magnetic attractive force being created because magnetic permeability of an intermediate member at a first temperature is less than at a second temperature, the intermediate member positioned relative to the actuator member such that total magnetic flux directed to the actuator member is dependent upon magnetic permeability of the intermediate member, and thus magnetic attractive force which causes the actuator member to move in a first direction is a function of temperature.

An advantage of the invention is that it can be used to help provide control systems capable of operating at relatively high temperatures. For example, the invention can be utilized to provide a temperature activated valve which helps prevent direct production of steam or other undesirable material in thermal recovery processes, including but not limited to (steam based) steam assisted gravity drain (SAGD), mixed well SAGD (Row of vertical wells used as steam injectors instead of horizontal steam injectors, FIG. 1), steam flooding (FIG. 2), cyclic steam simulation (FIG. 3), and (combustion based) fire flooding, Toe-to-Heel Air Injection Process (THAI™, FIG. 4), and Top Down. The temperature at which the device is activated may be the Curie temperature (in the case of magnetically actuated devices) or some other temperature. By selecting an appropriate material, the Curie temperature (or other temperature) and thus the temperature of activation may be close to that of the temperature of injected steam. The valve may be disposed relative to production tubing such that, if the fluid temperature reaches the steam temperature, the flow of fluid into the production well via the valve is slowed or stopped. In particular, the valve closes when the fluid reaches steam temperature and opens when the fluid is below steam temperature.

Further features and advantages of the invention will become more readily apparent from the following detailed description when taken in conjunction with the accompanying drawings.

BRIEF DESCRIPTION OF THE FIGURES

FIGS. 14A, 14B and 15 illustrate a reverse seated variant of the temperature activated pilot valve.

DETAILED DESCRIPTION

Figure 1:
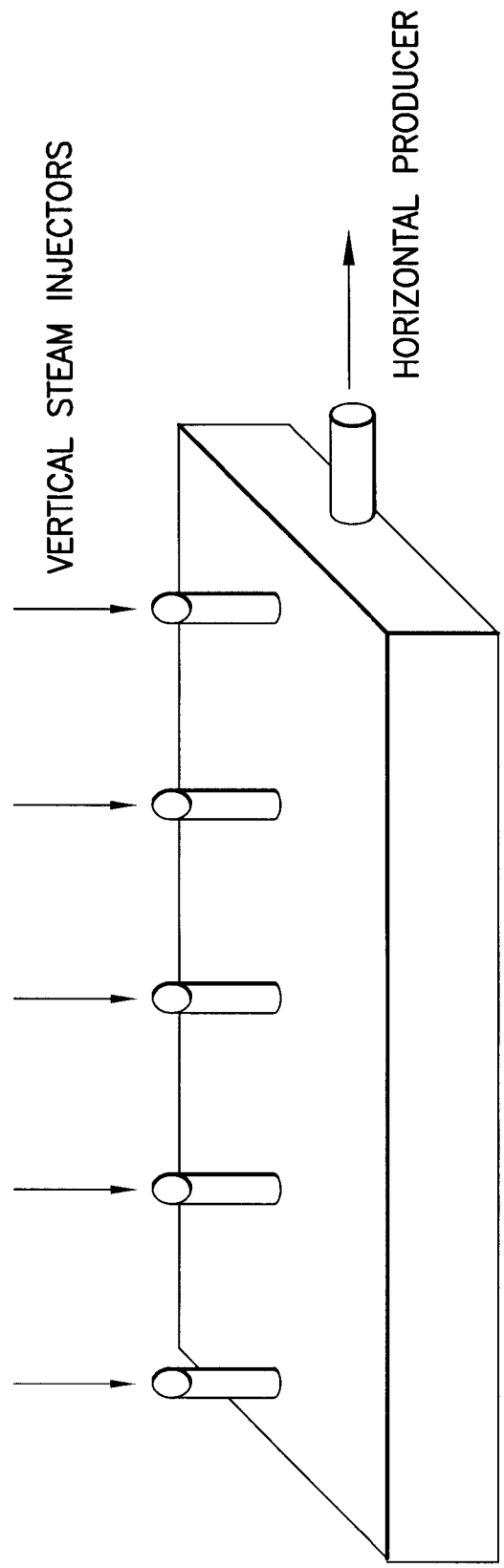
FIG. 1 illustrates mixed well SAGD.
Figure 2:
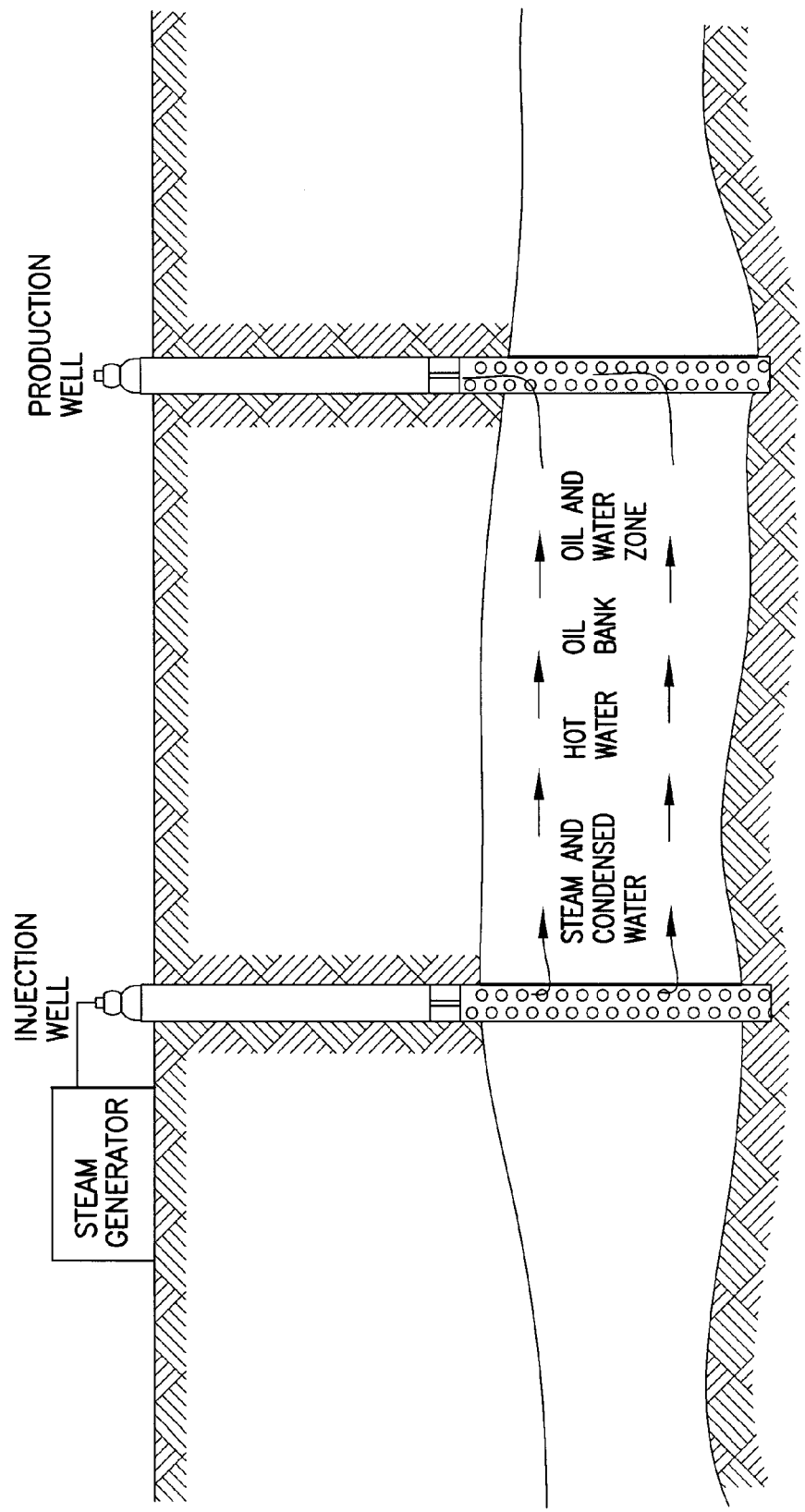
FIG. 2 illustrates steam flooding.
Figure 3:
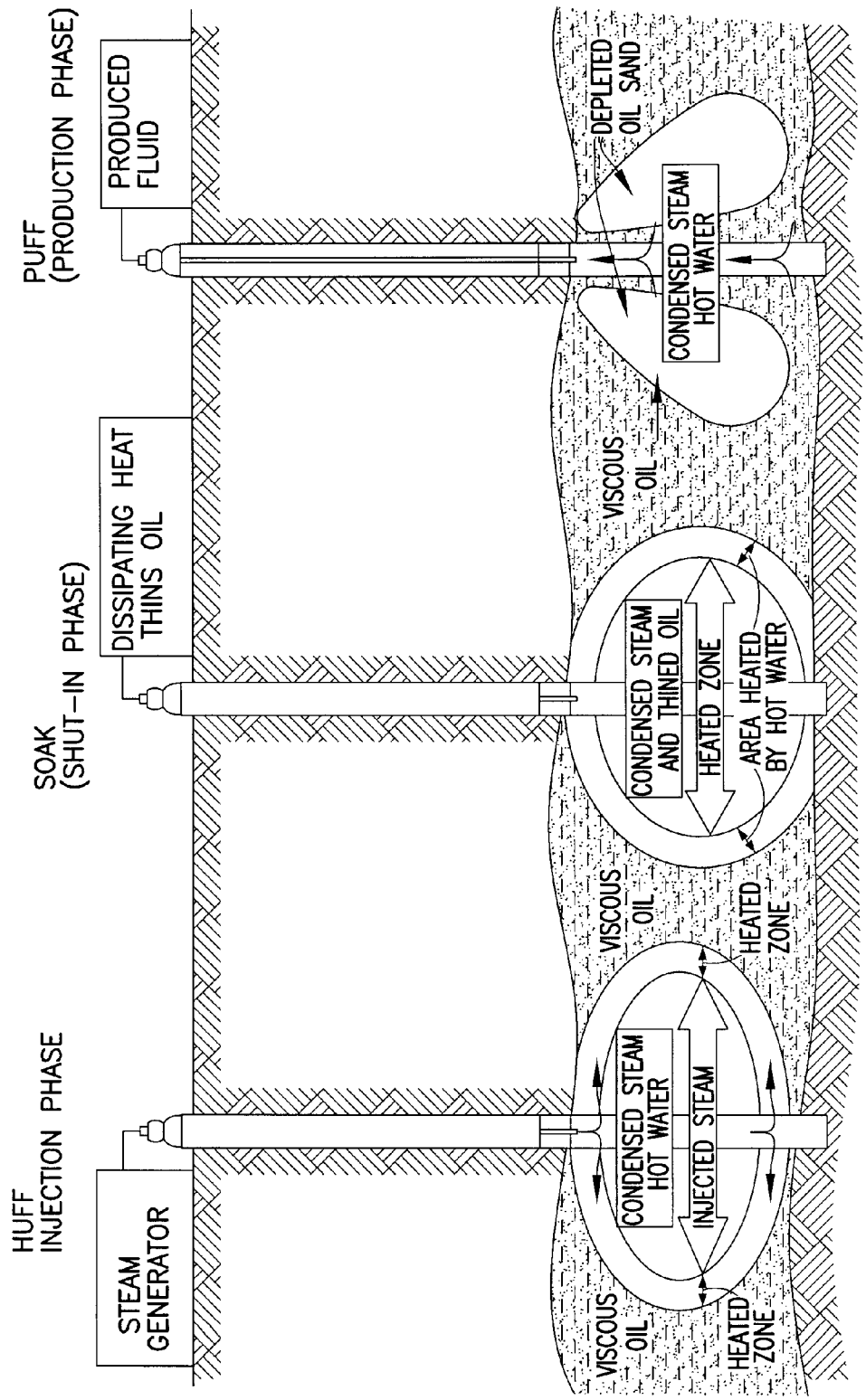
FIG. 3 illustrates cyclic steam stimulation.
Figure 4:
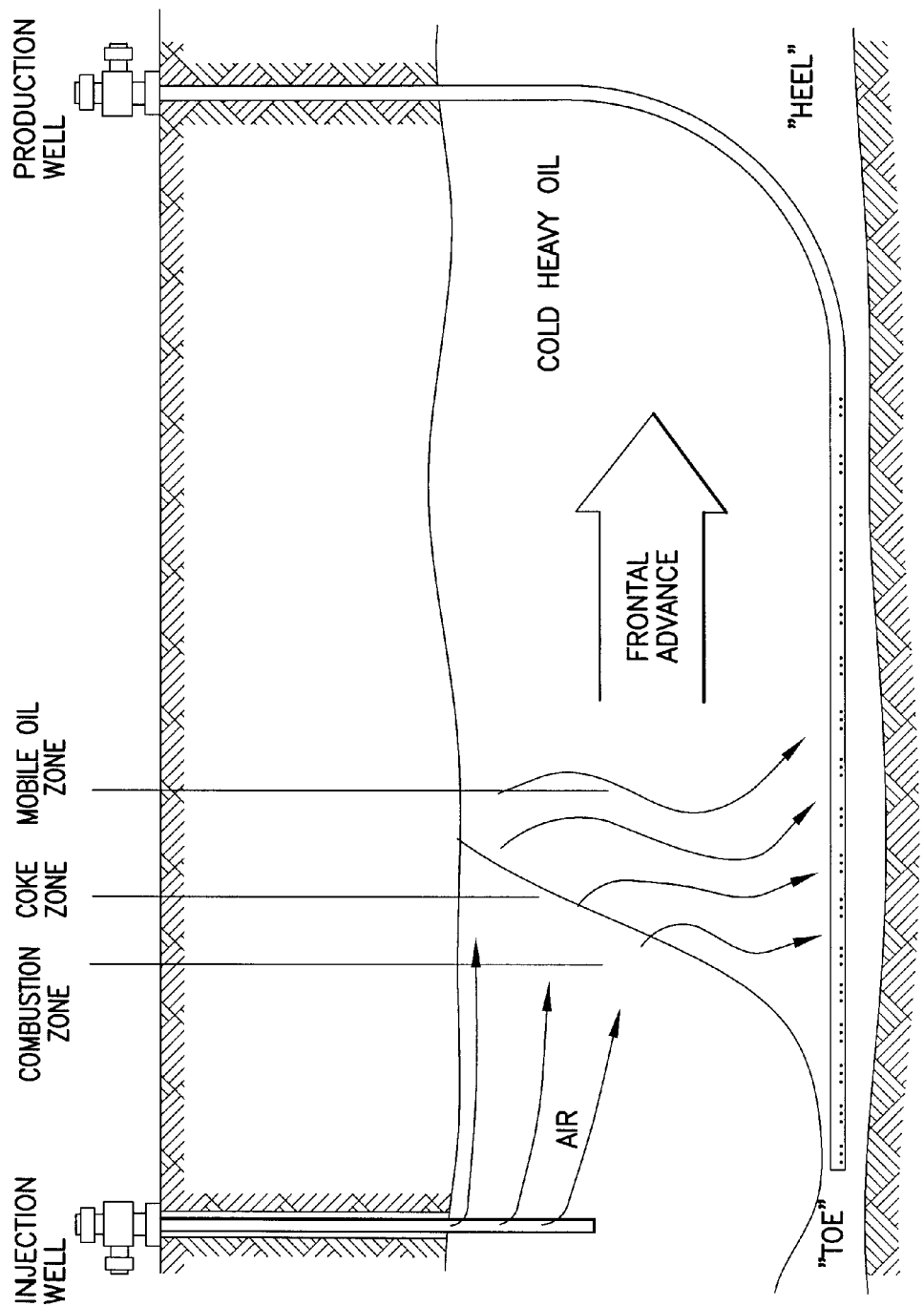
FIG. 4 illustrates Toe-to-Heel Air Injection.
Figure 5:
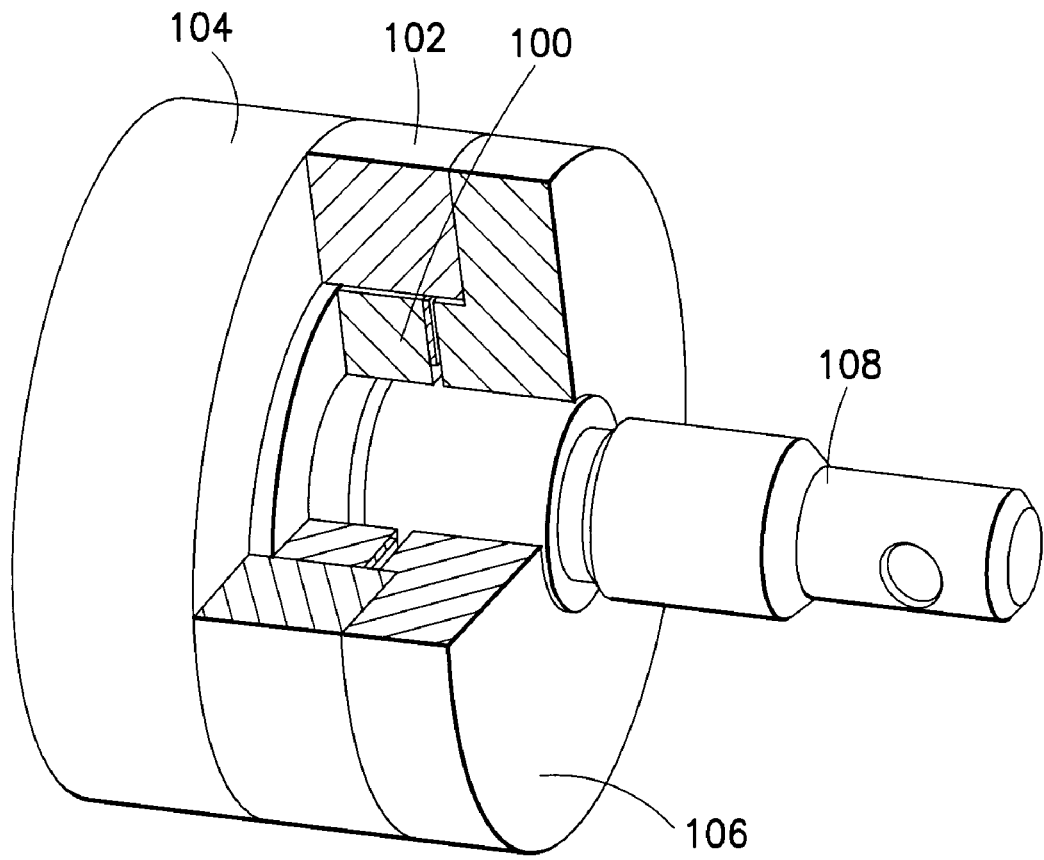
FIG. 5 is a perspective view of a temperature activated actuator.
Figure 6A:
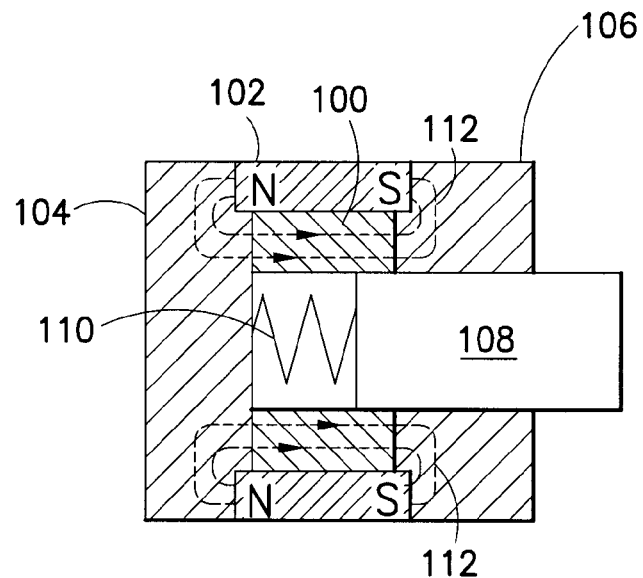
FIG. 6A is a cross sectional view of the actuator of FIG. 5 with an extended plunger.

FIGS. 5 through 7 illustrate a temperature activated actuator. The actuator includes a magnetic energy source (100), temperature-sensitive element (102), temperature-insensitive elements (104, 106), actuator plunger (108), and return spring (110). The magnetic energy source (100) may include, without limitation, at least one permanent magnet or an electromagnetic source. The temperature-sensitive element (102) is constructed of a material such as a ferrite that is sensitive to temperature in the sense that its magnetic properties change as a function of temperature. Typically, a threshold at which magnetic permeability will exhibit the greatest change, if any, is the Curie temperature. The Curie temperature will be used without limitation as an exemplary threshold in this description. The material may be selected such that, as the temperature of the element is raised beyond the Curie temperature, the magnetic permeability of the material decreases to a value close to free-space permeability. Further, at temperatures below the Curie temperature the magnetic permeability of the material is higher. It may also be desirable that the material exhibit a steep decline of magnetic permeability close to the Curie temperature. The temperature-insensitive elements (104, 106) may be constructed of a material which, relative to the temperature-sensitive element, exhibit a magnetic permeability that does not change significantly as a function of temperature, with a flat or modest decline of magnetic permeability close to the Curie temperature. Note that the term "temperature-insensitive" is a relative descriptor which does not imply that properties, magnetic or otherwise, will remain unchanged during changes in temperature. The actuator plunger (108) may be constructed of the same material as the temperature-insensitive elements, or a different material with similar properties. The return spring (110) is generally representative of a function which may be performed by a mechanical spring or any other feature capable of exerting sufficient return force to move the actuator plunger in the absence of magnetic attractive force.

The basic principle of operation of the temperature activated actuator is that first and second parallel pathways of lines of magnetic flux (112) are provided, and the magnetic permeability across at least one of the pathways is temperature dependent such that the magnitude of magnetic permeability is greater in the first pathway at a first temperature than at a second temperature. In the illustrated embodiment the first pathway is primarily through the temperature-sensitive element (102) and temperature insensitive elements (104, 106), while the second pathway is primarily through the actuator plunger (108) and temperature-insensitive elements (104, 106). The net force exerted on the actuator plunger by magnetism and the return spring is a function of which pathway is traversed by most of the magnetic lines of flux. In particular, when most of the lines of magnetic flux traverse the first path, the spring force predominates, and when most of the lines of magnetic flux traverse the second path the magnetic attraction force between the actuator plunger (108) and the temperature insensitive base (104) predominates. Lines of magnetic flux also traverse the guide (106) of the temperature-insensitive element, which is operable to inhibit non-linear motion of the actuator plunger. Because the magnetic permeability of the temperature-sensitive element (102) is a function of temperature, the path traversed by most of the magnetic lines of flux, and consequently the net force acting on the actuator plunger, is a function of temperature. The result is linear actuator travel over a distance d in response to a change in temperature that traverses the Curie temperature. In particular, the actuator plunger is actuated at or about the temperature at which the magnetic permeability of the temperature-sensitive element becomes less than the magnetic permeability of the temperature-insensitive elements.

Figure 6B:
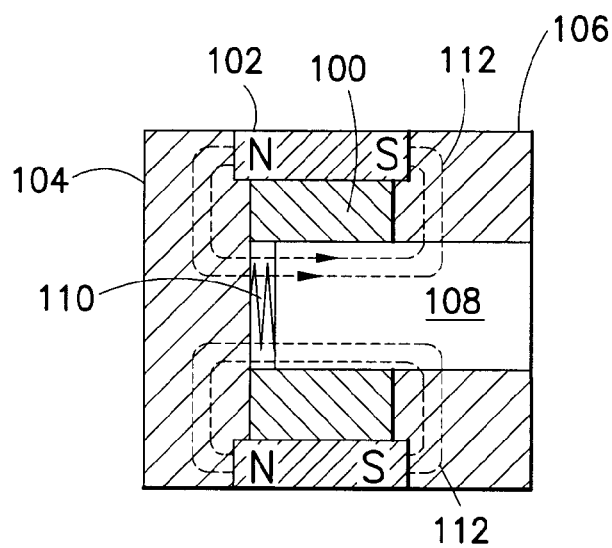
FIG. 6B is a cross sectional view of the actuator of FIG. 5 with a retracted plunger.
Figure 7A:
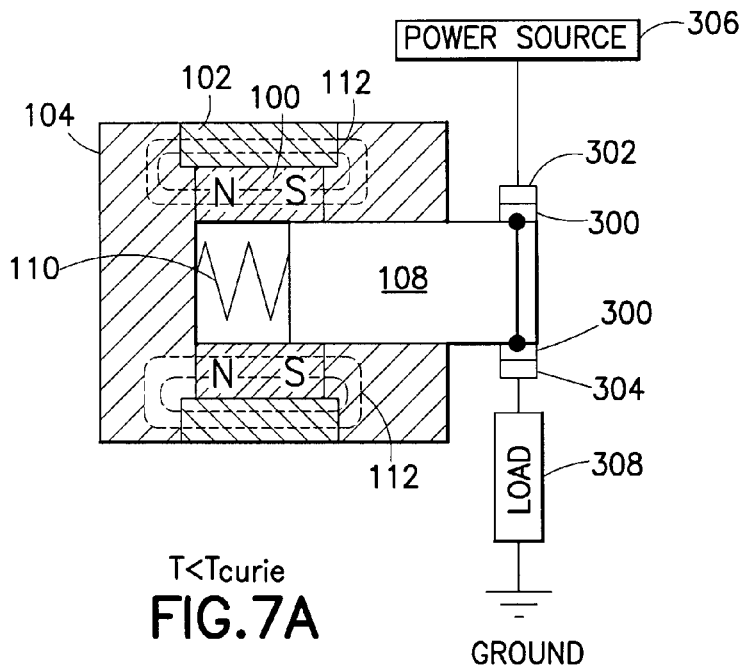
FIGS. 7A and 7B illustrate a temperature activated switch that closes below a threshold temperature, and opens above that temperature.
Figure 7B:
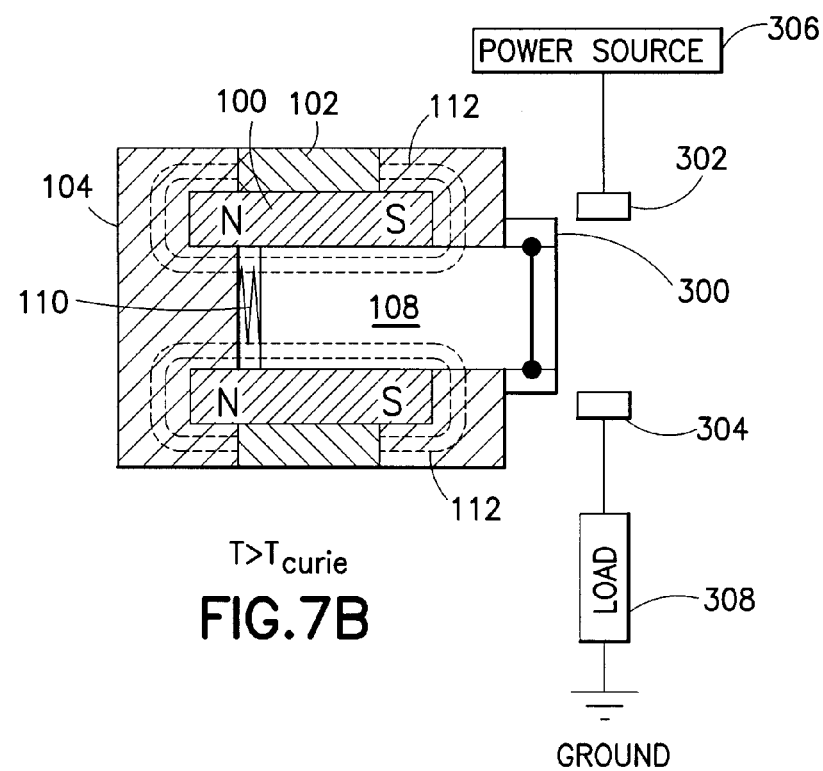

FIGS. 7A and 7B illustrate an embodiment of an electrical switch based on the temperature activated actuator of FIGS. 5 through 6B. Interconnected electrical contacts (300) are disposed on the actuator plunger (108), i.e., electrical resistance between the contacts is low. Corresponding stationary contacts (302, 304) are connected via electrical wiring to a power source (306) and load (308), respectively. When the temperature is above the Curie temperature, the actuator plunger (108) is extended in response to the force of the spring (110), and an electrical pathway is provided between the power source and load by virtue of the electrical contacts physically touching one another. When the temperature is greater than the Curie temperature, as specifically shown in FIG. 7B, the actuator plunger is retracted due to magnetically attractive force and the electrical pathway between power source and load is broken. Thus, a temperature sensitive electrical switch is provided.

Figure 8A:
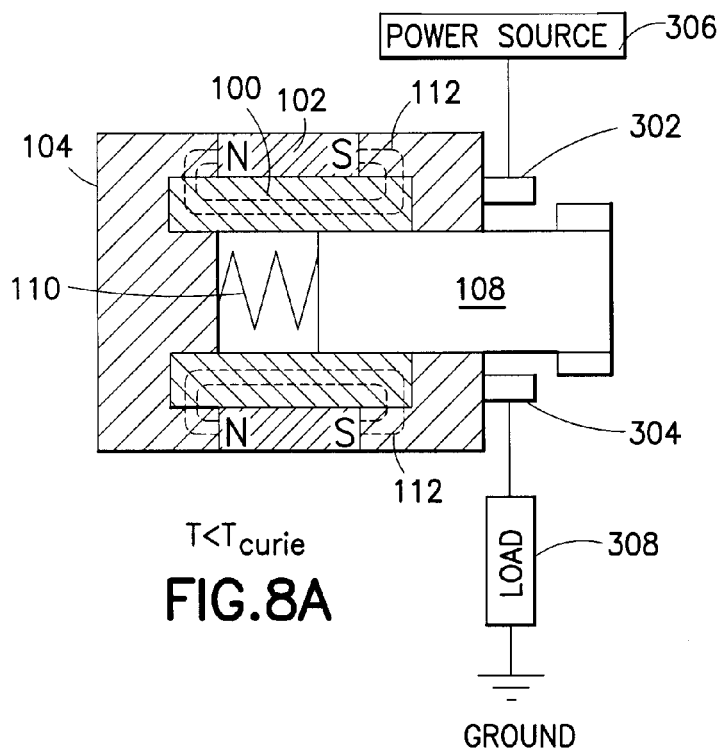
FIGS. 8A and 8B illustrate a temperature activated switch that opens below a threshold temperature, and closes above that temperature.
Figure 8B:
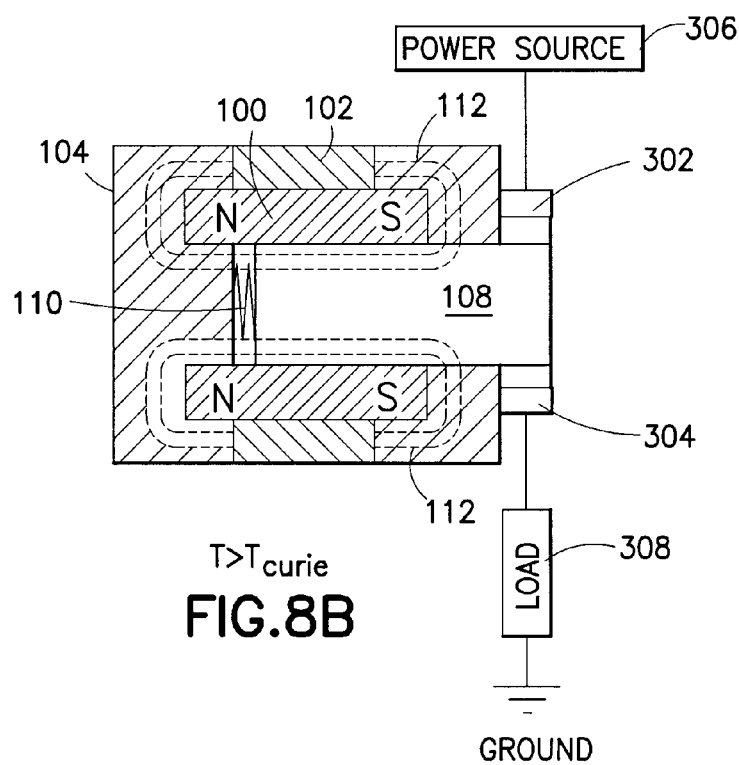

As shown in FIGS. 8A and 8B, the state of the electrical switch relative to the Curie temperature can be inverted by repositioning the stationary contacts associated with the power source and load. In particular, the stationary contacts (302, 304) are disposed in a fixed location such that an electrical pathway is formed when the actuator plunger is retracted, rather than when it is extended.

Figure 9:
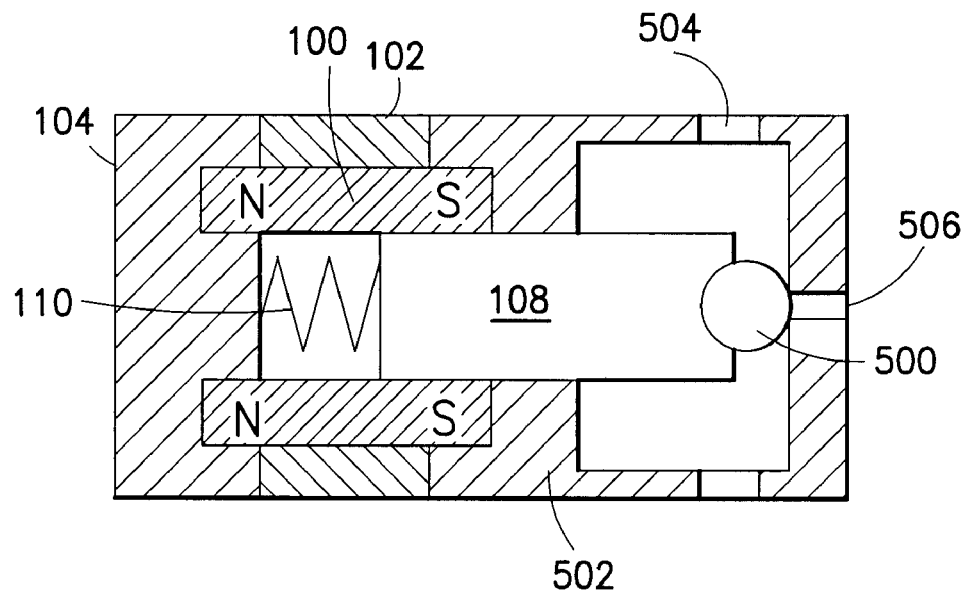
FIG. 9 illustrates a normally seated 2-way temperature activated valve.

FIG. 9 illustrates a normally seated 2-way ball-and-seat valve based on the temperature activated actuator of FIGS. 5-6B. A sealing ball (500) is disposed on one end of the actuator plunger (108), and the actuator plunger extends into a cavity defined by a body (502) having an inlet port (504) and outlet port (506). When the actuator plunger is extended, the sealing ball seats in the outlet port, thereby closing the fluid flow pathway through the cavity. The valve is held closed by the combined force of the return spring and fluidic force due to differential pressure between the inlet and outlet ports. When the actuator plunger is retracted, the sealing ball is unseated and fluid can flow from inlet to outlet. Due to the sealing force being a function of both the spring and the fluid pressure differential, there may be practical limitations to the area of the inlet and outlet ports, and thus flow rate in the open position. Further, there may be a differential pressure beyond which the valve cannot practically be opened by the magnetic forces acting upon the actuator plunger.

Figure 10:
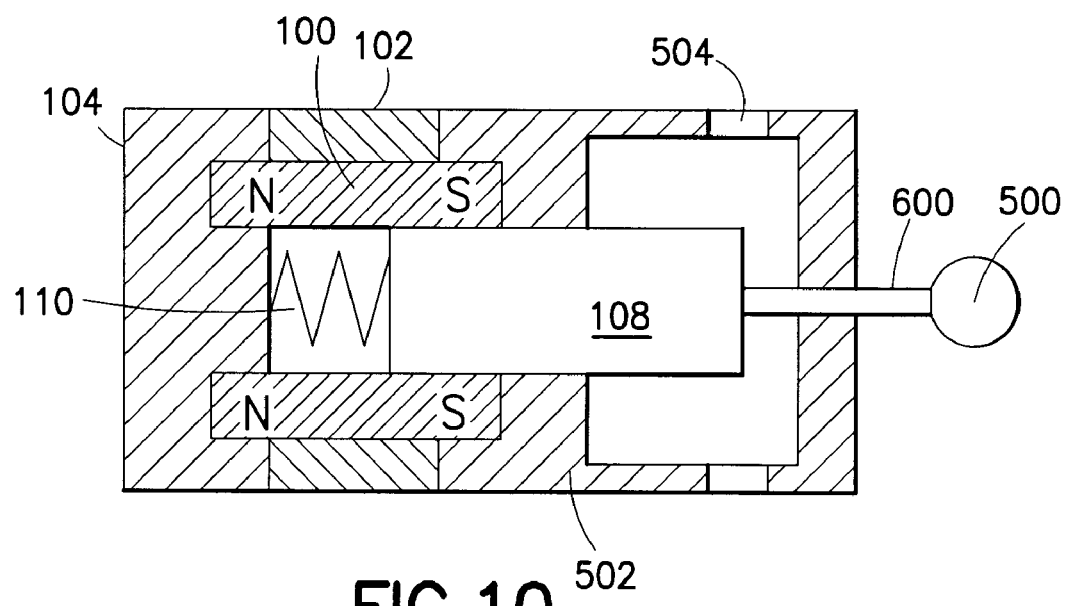
FIG. 10 illustrates a reverse seated 2-way temperature activated valve.

FIG. 10 illustrates a reverse seated embodiment of the 2-way ball-and-seat valve. In this embodiment the sealing ball (500) is disposed on a stem (600) which is connected to the actuator plunger (108) and extends through the outlet port. Because the stem is disposed through the outlet port, the ball seals the outlet port on an outside surface of the body. The reverse seated valve is held closed by the force of the spring minus the force due to differential pressure between the inlet port and outlet port. Indeed, the return spring may not be required in this embodiment because the force upon the actuator plunger due to differential fluid pressure is inverted relative to the embodiment of FIG. 9, i.e., the differential fluid pressure will tend assist extension of the actuator plunger. As with the previous embodiment, there may be practical limitations to the area of the inlet and outlet ports, and thus flow rate. Further, there may be a differential pressure beyond which the valve cannot practically be closed by the magnetic forces acting upon the actuator plunger.

Figure 11A:
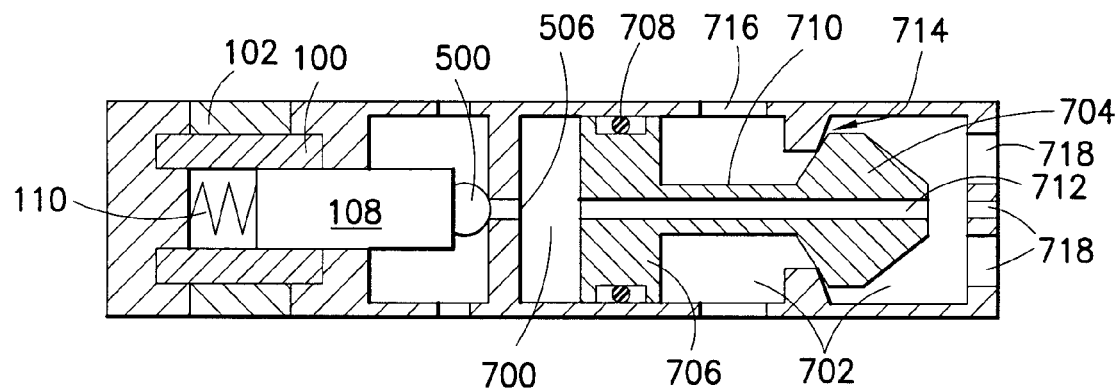
FIGS. 11A and 11B illustrate a temperature activated pilot valve.
Figure 11B:
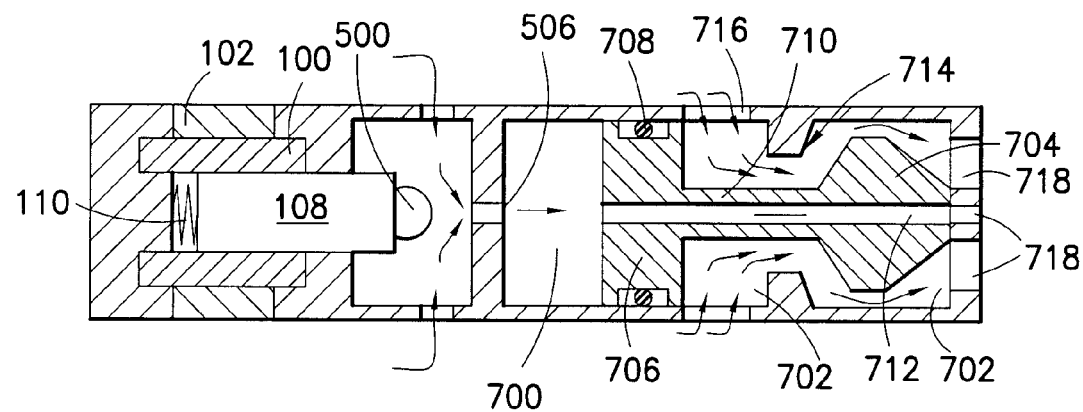
Figure 12:
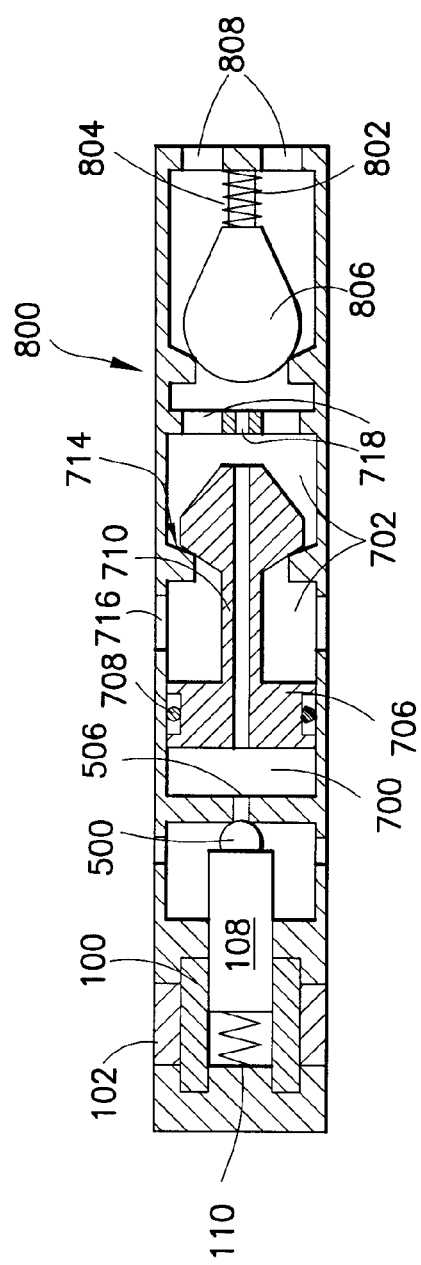
FIG. 12 illustrates a temperature activated pilot valve with a check valve.

FIGS. 11A and 11B illustrate an alternative embodiment in which the normally seated 2-way ball-and-seat temperature sensitive valve of FIG. 9 is employed as a pilot valve to control a piloted main valve. The piloted valve includes a piloted chamber (700) and a dividable flow chamber (702) defined by a power dart (704) having a piston (706) with dynamic seal (708), stem (710) with integral flow tube (712), and conical sealing member (714). The power dart is disposed in a body having a sealing seat corresponding to the conical sealing member, inlet ports (716) and outlet ports (718). When the actuator plunger of the pilot valve is extended at a temperature less than Curie temperature, the pilot valve is in the closed position, i.e., the sealing ball is seated and prevents flow through the outlet port (506). The pressure at the outlet ports (718) of the piloted valve is communicated to the piloted chamber (700) via the flow tube (712). Differential pressure between the inlet ports (716) and outlet ports (718) of the piloted valve exerts force on the power dart resulting in a stem and seat seal between the conical sealing member and the sealing seat. When the actuator is actuated by temperature less than Curie temperature, the piloting valve opens, i.e., the sealing ball is unseated from the outlet port. Consequently, pressure at the inlet port of the piloting valve is communicated to the piloted chamber. The relatively small cross-sectional area of the flow tube (712) relative to the fluid flow chamber results in flow restriction such that greater pressure is maintained in the piloted chamber relative to the outlet ports of the piloted valve. As a result, the differential pressure between the piloted chamber (700) and the outlet ports (718) of the piloted valve exerts a force on the power dart which unseats the conical seal member, thereby opening the piloted valve and allowing fluid to flow from the inlet ports to the outlet ports of the piloted valve. When the actuator re-establishes the ball-and-seat seal in the piloting valve due to temperature change, force due to differential fluidic pressure is exerted upon the power dart to re-establish the stem-and-seat seal as already described above. In other words, positive differential pressure between inlet ports and outlet ports creates the force required to shift the power dart and maintain the stem-and-seat seal.

Referring now to FIG. 8, a check valve (800) may be utilized to help ensure reliable operation of the piloted valve. In cases where the pressure differential may be insufficient to maintain the stem-and-seat seal, or where the pressure differential may be reversed, a check valve may be placed in series with the piloted valve. In the illustrated embodiment the check valve is of the ball-and-seat type, including a spring (802), stem (804) and sealing ball (806) which seals against a seating surface of the body in response to force exerted by the spring. The net force upon the sealing ball (806) is a combination of spring force and any force due to pressure differential between the outlet ports of the piloted valve and outlet ports (808) of the check valve. Where differential pressure is low, or greater at the outlet ports of the check valve than the outlet ports of the piloted valve, the check valve remains seated and prevents backflow of fluid into the piloted valve. When the pressure at the outlet ports of the piloted valve is sufficiently greater than the pressure at the outlet ports of the check valve, i.e., resulting in a force greater than the spring force, the check valve opens because the sealing ball is unseated, thereby permitting fluid to flow from the outlet ports of the piloted valve to the outlet ports of the check valve.

Figure 13:
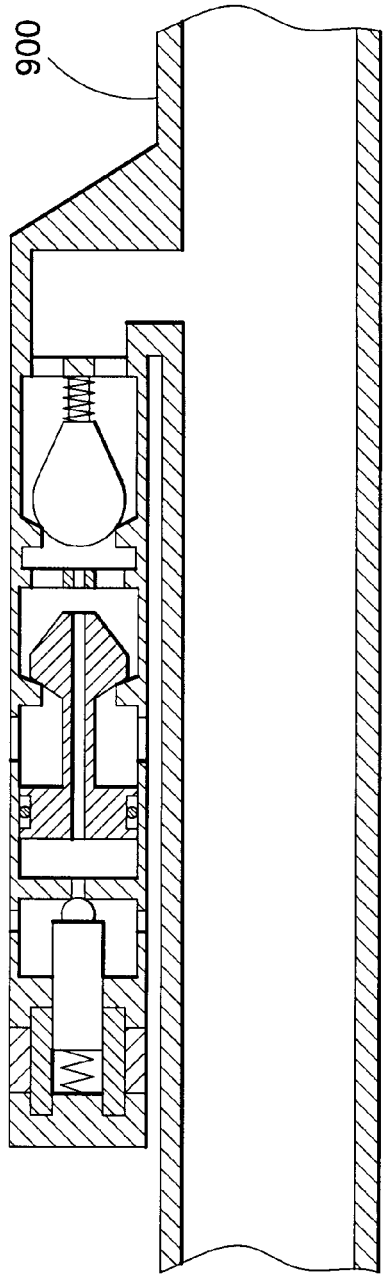
FIG. 13 illustrates a temperature activated pilot valve with a check valve integrated into a completion.

As shown in FIG. 13, the valve body may be integrated with the completion of a production well. For example, the valve body may be affixed to the outside of the production tubing (900) such that the outlet ports of the check valve are in communication with the production tubing, and isolated from the formation. Alternately, the valve body may be disposed inside the completion tubing, retrievable by wireline or slickline operations.

Figure 15:
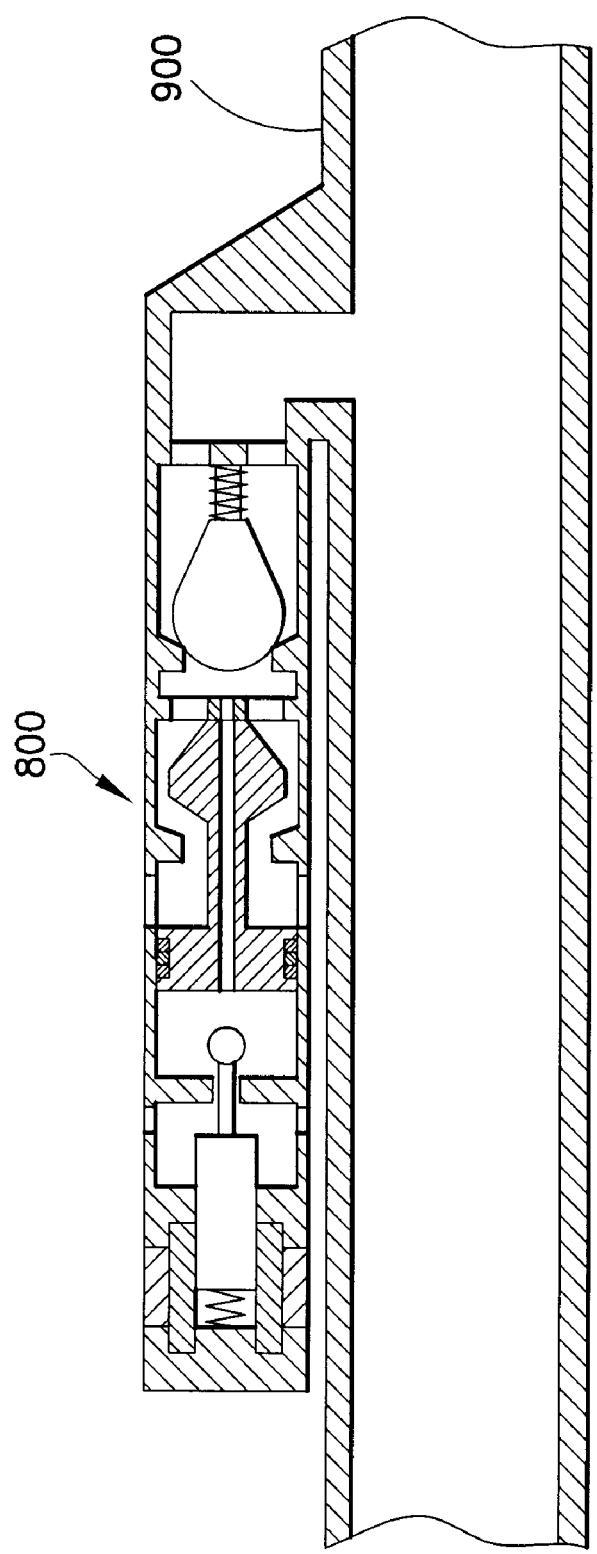

FIGS. 14A and 14B illustrate an alternative embodiment in which a reverse seated piloting valve is utilized to control the piloted valve already described above. The fluidic forces acting upon the valve are as already described above. However, the state of the valve relative to Curie temperature is inverted. In particular, the reverse seated piloting valve closes at temperatures greater than the Curie temperature, resulting in closure of the piloted valve. At temperatures less than the Curie temperature the reverse seated valve opens, resulting in opening of the piloted valve. As shown in FIG. 15, this embodiment may be augmented with a check valve (800), and may be integral to the completion.

Figure 16:
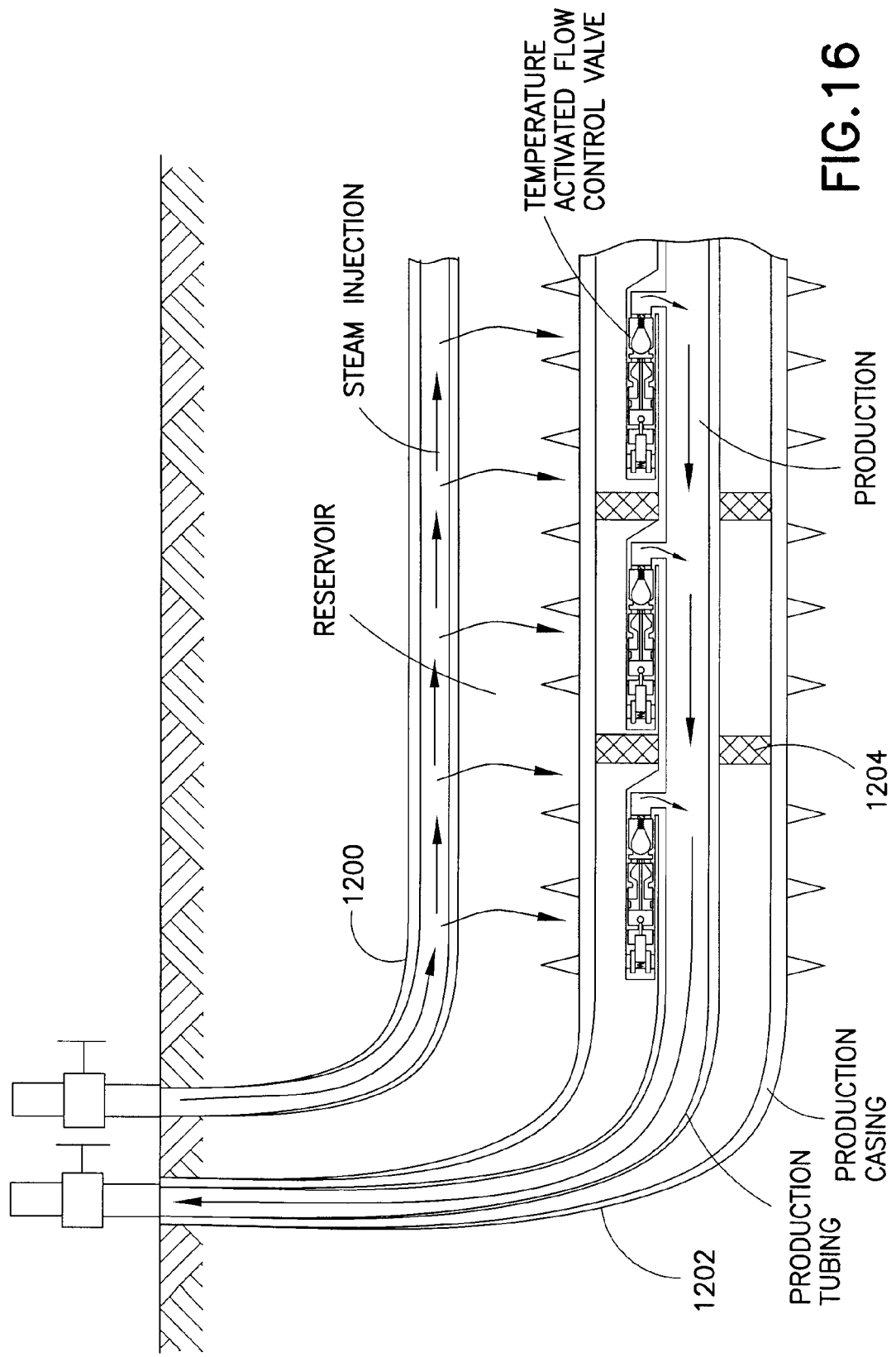
FIG. 16 illustrates use of the temperature activated pilot valve in a SAGD bitumen recovery operation.

FIG. 16 illustrates use of a temperature-triggered valve for inflow control of steam-assisted gravity drained (SAGD) production well. Two boreholes are drilled with vertically-displaced horizontal sections in relatively close proximity to one another. Initially, steam is circulated in both boreholes to increase the temperature of hydrocarbons in the reservoir in close proximity to the boreholes. After the temperature has been increased to a target level for a predetermined period of time, steam is injected into the upper borehole (1200) and heated hydrocarbons are produced from the lower borehole (1202). As already described above with reference to FIGS. 14A and 14B, the temperature triggered reverse seated piloting valve is open at temperatures below the Curie temperature of the temperature sensitive element. In this embodiment, the material of which the temperature sensitive element is constructed is selected such that the Curie temperature is close to the temperature of injected steam, e.g., without limitation, +/−25° C. or less. If the production well temperature reaches the Curie temperature (and thus steam temperature), the piloting valve closes and fluid flow through the piloted valve slows or stops. When the temperature drops below Curie temperature the piloted valve opens.

Because it is possible to have significant temperature variation through the production well, particularly along extended horizontal sections, it may be desirable to utilize multiple temperature activated valves at regular intervals. The valves may be separated by packers (1204) to help prevent cross flow in the annular region. The packers may be deployed via mechanical manipulation, electrical actuation or by the use of swellable elastomers.

Figure 17:
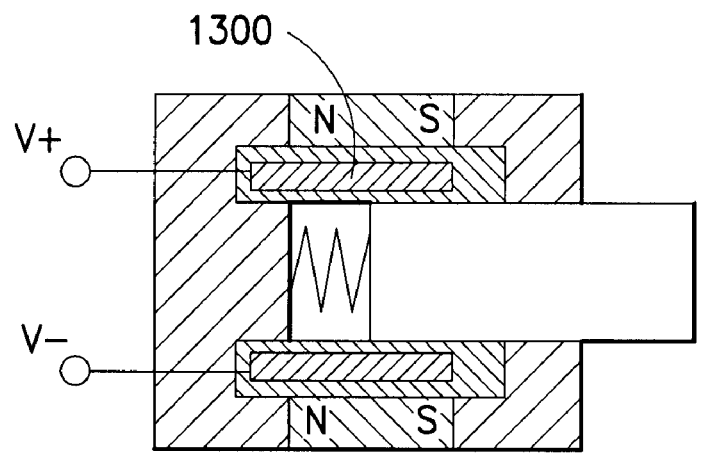
FIGS. 17 and 18 illustrate electrically controlled variants of the temperature activated actuator.
Figure 18:
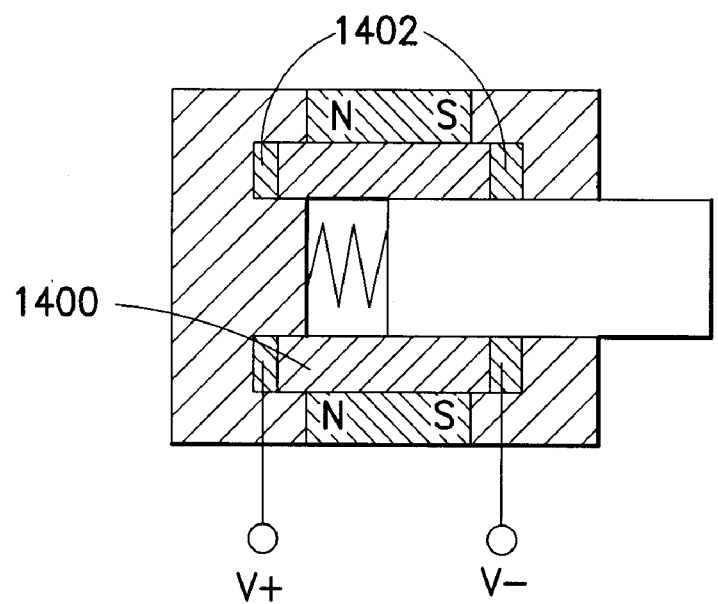

FIGS. 17 and 18 illustrate electrically controllable, heat activated actuators. The actuators operate in accordance with the same magnetic principles described above. However, the actuator may be activated by electrically created Curie temperature. In the embodiment depicted in FIG. 17 the temperature sensitive element includes an integral resistive element (1300). The resistive element releases heat in response to electrical input, i.e., $I^2R$. As shown in FIG. 18, a temperature sensitive component (1400) equipped with electrodes (1402) may be used to produce the necessary heat to activate the device if the selected material possesses the requisite electrical properties. In particular, electrodes (1402) are embedded in opposite ends of the temperature sensitive element, and a control signal inputted across the electrodes results in generation of $I^2R$ heat. Materials that exhibit desirable magnetic properties and high internal electrical resistance are generally good candidates.

Figure 19:
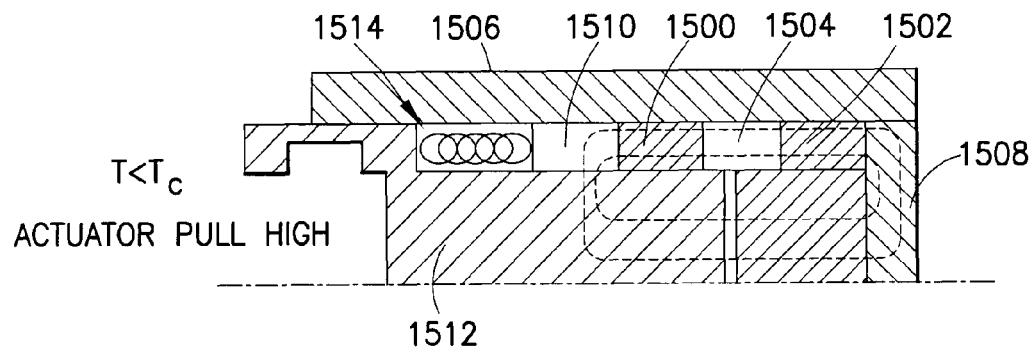
FIGS. 19 and 20 illustrate an alternative temperature activated actuator.
Figure 20:
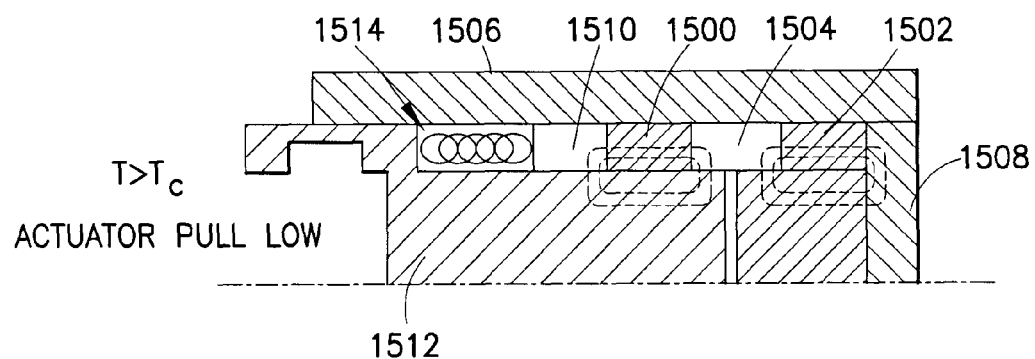

FIGS. 19 and 20 illustrate an alternative temperature activated actuator. In the alternative embodiment a first (1500) and second (1502) permanent magnet separated by a temperature responsive ferrite (1504) are disposed against a non-magnetic housing (1506). A magnetic steel base member (1508) is disposed against the temperature responsive ferrite, second magnet, and non-magnetic housing. Another magnetic steel member (1510) is disposed against the non-magnetic housing and the first magnet (1500). A movable actuator (1512) is disposed against magnetic steel member, first magnet and temperature responsive ferrite. A spring (1514) is disposed between the actuator and the magnetic steel member. At temperature less than Curie temperature the magnetic lines of flux form a single set of loops traversing the temperature responsive ferrite, second magnet, magnetic steel base, actuator, steel member and first permanent magnet. Consequently, magnetic attractive force pulls the actuator toward the base. At temperature greater than Curie temperature the magnetic lines of flux no longer traverse the temperature responsive ferrite lengthwise, resulting in two sets of loops, neither of which include significant lines of flux between the actuator and base. Consequently, magnetic attractive force between the actuator and base is reduced, and spring force pushes the actuator away from the base.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus actuated in response to temperature comprising:
   a power source operative to provide magnetic lines of flux;
   an actuator member; and
   an intermediate member;
   wherein, a first potential pathway for the magnetic lines of flux traverses the actuator member and a second potential pathway for the magnetic lines of flux traverses the intermediate member, and wherein magnetic permeability of the intermediate member at a first temperature is less than at a second temperature, the intermediate member positioned relative to the actuator member such that total magnetic flux directed to the actuator member is dependent upon magnetic permeability of the intermediate member, and thus magnetic attractive force which causes the actuator member to move in a first direction is a function of temperature; and
   a sealing member disposed on the actuator member, and a housing having an inlet port and an outlet port such that the sealing member, when seated against a port, prevents fluid flow through the housing, thereby providing a 2-way valve.

2. The apparatus of claim 1 further including a return member operative to cause the actuator member to move in a second direction at the second temperature.

3. The apparatus of claim 2 wherein the return member includes a spring.

4. The apparatus of claim 1 further including a base member, and wherein magnetic attractive force between the base member and the actuator member causes the actuator member to move in the first direction at the first temperature.

5. The apparatus of claim 1 further including at least one electrical connector disposed on the actuator member to provide a temperature triggered electrical switch.

6. The apparatus of claim 1 wherein the 2-way valve is employed as a piloting valve, and further comprising a piloted valve having a housing with an inlet port and an outlet port, and a movable sealing member which defines a piloted chamber having an inlet in communication with the outlet port of the piloting valve, and a flow tube which places the piloted chamber in hydraulic communication with the piloted valve outlet port.

7. The apparatus of claim 6 wherein the movable sealing member includes a seating surface, and wherein the seating surface closes the piloted valve in response to closure of the piloting valve.

8. The apparatus of claim 7 wherein the piloted valve is held closed by differential fluid pressure.

9. The apparatus of claim 8 further including a check valve which inhibits fluid flow into the outlet port of the piloted valve.

10. The apparatus of claim 1 further including electrodes connected to the intermediate member such that the intermediate member is heated by flow of electrical current between the electrodes.

11. The apparatus of claim 10 further including a resistive element disposed in the intermediate member, the electrodes being connected to the resistive element.

12. A method of triggering actuation of an actuator member in response to temperature comprising:
   with magnetic attractive force, causing an actuator member to move in a first direction, the magnetic attractive force being created because magnetic permeability of an intermediate member at a first temperature is less than at a second temperature, the intermediate member positioned relative to the actuator member such that total magnetic flux directed to the actuator member is dependent upon magnetic permeability of the intermediate member, and thus magnetic attractive force which causes the actuator member to move in a first direction is a function of temperature; and
   a sealing member disposed on the actuator member, and a housing having an inlet port and an outlet port, and preventing fluid flow through the housing by seating the sealing member against a port, thereby providing a 2-way valve.

13. The method of claim 12 further including causing the actuator member to move in a second direction at the second temperature.

14. The method of claim 13 further including using spring force for causing the actuator member to move in a second direction at the second temperature.

15. The method of claim 12 further including a base member, and causing the actuator member to move in the first direction at the first temperature with magnetic attractive force between the base member and the actuator member.

16. The method of claim 12 further including providing a temperature triggered electrical switch with at least one electrical connector disposed on the actuator member to establish an electrical pathway when the actuator member is in a predetermined position.

17. The method of claim 12 including the further step of employing the 2-way valve as a piloting valve for a piloted valve having a housing with an inlet port and an outlet port, and a movable sealing member which defines a piloted chamber having an inlet in communication with the outlet port of the piloting valve, and a flow tube which places the piloted chamber in hydraulic communication with the piloted valve outlet port.

18. The method of claim 17 wherein the movable sealing member includes a seating surface, and closing the piloted valve in response to closure of the piloting valve.

19. The method of claim 18 including holding the piloted valve closed by differential fluid pressure.

20. The method of claim 19 further including inhibiting fluid flow into the outlet port of the piloted valve with a check valve which.

21. The method of claim 12 further including heating the intermediate member by flow of electrical current between electrodes.

22. The method of claim 21 further including heating the intermediate member with a resistive element disposed in the intermediate member, the electrodes being connected to the resistive element.

\* \* \* \* \*